(12) United States Patent
Patrick et al.

(10) Patent No.: US 7,607,236 B1
(45) Date of Patent: Oct. 27, 2009

(54) FUNCTIONAL ROLLING MASTER GEAR, SPINDLE, AND ARBOR COMPENSATION

(75) Inventors: Jeffrey J. Patrick, Alexandria, MN (US); Darren E. Santelman, Alexandria, MN (US)

(73) Assignee: Illinois Tool Works Inc., Glenview, IL (US)

( * ) Notice: Subject to any disclaimer, the term of this patent is extended or adjusted under 35 U.S.C. 154(b) by 15 days.

(21) Appl. No.: 12/099,274

(22) Filed: Apr. 8, 2008

(51) Int. Cl.
*G01M 13/02* (2006.01)

(52) U.S. Cl. .................. 33/501.19; 33/502; 73/162

(58) Field of Classification Search .......... 33/501.7, 33/501.8, 501.16, 501.19, 502; 73/162
See application file for complete search history.

(56) References Cited

U.S. PATENT DOCUMENTS

| | | | | |
|---|---|---|---|---|
| 3,590,491 A | * | 7/1971 | Anthony | 33/501.19 |
| 4,550,508 A | * | 11/1985 | Spaeth | 33/501.19 |
| 4,704,799 A | | 11/1987 | Kobetsky | |
| 5,016,471 A | * | 5/1991 | Och | 73/162 |
| 5,392,644 A | * | 2/1995 | Frazier | 73/162 |
| 5,662,439 A | * | 9/1997 | Reese et al. | 33/501.7 |
| 5,689,993 A | * | 11/1997 | Matsumoto | 73/162 |
| 2005/0060903 A1 | * | 3/2005 | Winn | 33/501.13 |

* cited by examiner

*Primary Examiner*—G. Bradley Bennett
(74) *Attorney, Agent, or Firm*—Levenfeld Pearlstein, LLC

(57) ABSTRACT

A method for providing error compensation in a double flank functional gear testing apparatus is disclosed in which a total composite signal is generated and errors due to master gears, master gear spindles, arbors, and work gear holding devices are eliminated from the total composite signal, such that the error due to a work or precision setting master gear is distilled.

20 Claims, 4 Drawing Sheets

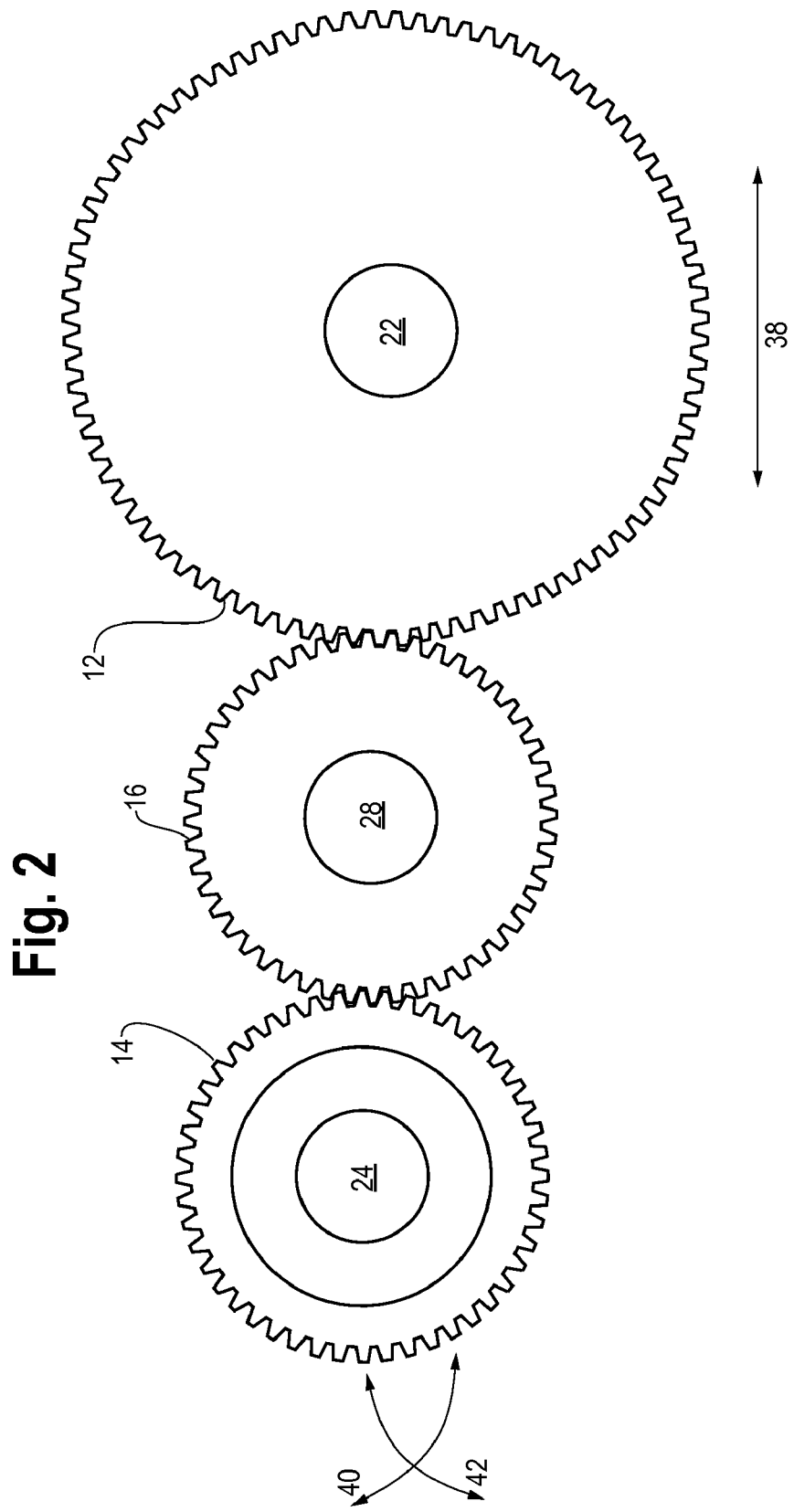

FUNCTIONAL ROLLING MASTER GEAR, SPINDLE, AND ARBOR COMPENSATION

BACKGROUND OF THE INVENTION

The present invention is directed to a method for providing error compensation for rolling master gears, master gear spindles, work spindles, work gear holding devices, and the like in a functional double flank gear checking apparatus.

Functional gear testing measures the total effect of gear errors. Also known as total radial composite deviation, testing of the gears involves determining how the gears operate when in contact with one another.

A method normally used to evaluate gear operational efficiency is double flank gear testing. In double flank gear testing, the gears are placed in a tight mesh, producing contact on both flanks of the gear teeth. Generally, the gear being inspected, the work gear, is mounted to a fixed arbor. A master gear is mounted to a fixed or adjustable slide and put in contact with the work gear.

When work gears and master gears are rolled together on rolling fixtures with either fixed or adjustable centers, dimensional variations during one revolution of the work gear may be determined. Variations caused by differing tooth thickness, nicks, cuts, and other imperfections cause a change in the center distance between a work gear and a master gear when rolled together in a tight mesh. In addition, variations in the incline or shape of the teeth are also measured, known as gear lead and gear taper.

Determining the accuracy of the work gear and error due to the work gear relies on the accuracy of the master gear and master gear spindle, as well as other components of the testing system. Gear testing devices currently available assume that the variations or discrepancies in gear rotation are due to imperfections in the work gear being tested. Precision master gears are used for intermeshing with the test or work gear during testing, such that it can be assumed that imperfections observed are due to defects in the test gear. Precision master gears are relatively difficult and expensive to produce. Even with such accurate gears, however, wear and/or damage may create irregularities in the precision master gear, giving imprecise readings.

Also present are errors from the master gear, the master gear spindle and the work gear arbor and spindle. The master gear and master gear spindle are used as references to collect test data and thus, must also be extremely accurate and frequently calibrated. However, unless the master gear and spindle are frequently calibrated and have a known error, the amount of error attributable to the work gear alone cannot be measured accurately because the error attributable to the work gear is only a portion of the total error present in the apparatus. The error found in known double flank gear testing methods is the total error of the system and does not isolate the error caused by the work gear. However, there is no simple way of determining solely the work gear error; in other words, there is no clear, easy way to isolate the error attributable to the work gear from the total error present in the system.

Accordingly, there is a need for a method to easily determine the error attributable to a work gear alone. Desirably, such a method uses the same displacement measurement device as is used for the actual double flank functional gear inspection. Also desirable would be a method that introduces no errors due to structural flexing into the error compensations. In addition, the complete compensation would be done automatically without variables induced by human intervention or inconsistencies, and leaving the operator free to attend to other requirements, thus significantly reducing the set-up change over time.

BRIEF SUMMARY OF THE INVENTION

A method for providing error compensating in a double flank functional gear testing device is disclosed in which a total composite signal is generated and the errors due to master gears, master gear spindles, and work gear holding devices are eliminated from the total composite signal, such that the error due to the work gear is distilled. The error attributable to the master gear and master gear spindle is determined by comparing gear mesh center distance, gear lead, and gear taper of the teeth on the master gear to a single reference on a precision setting master gear. The error in the work gear holding device is evaluated by placing a precision setting master gear on a work spindle and arbor and evaluating the gear mesh center distance, the gear lead and gear taper simultaneously for one rotation of the precision setting master gear. Subsequent displacement measurements are evaluated for each of a plurality of radial count positions for one revolution of the precision setting master gear.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIG. 2 is a plan view of the present gear testing device;

DETAILED DESCRIPTION OF THE INVENTION

Figure 1:
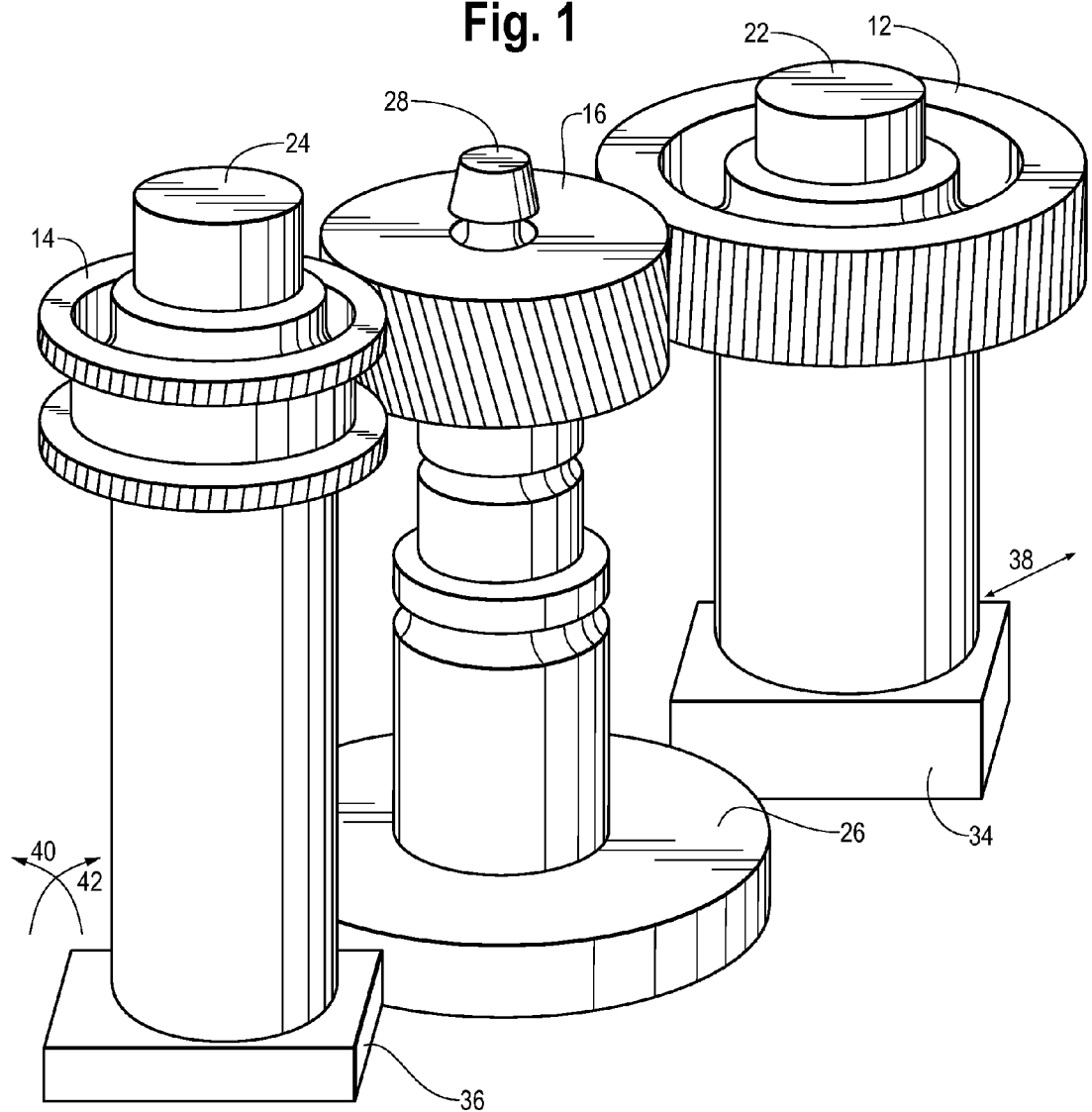
FIG. 1 is a perspective view of a double flank gear testing device used with the present disclosed method.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring now to FIGS. 1-2, an embodiment of the gear testing apparatus is shown for use with a method for providing for error compensating for rolling master gears, master gear spindles, work holding devices, and piece part work holding devices in a functional double flank gear checking apparatus.

The total error in a functional double flank gear checking apparatus includes the error from the test or precision setting master gear plus the error from the rolling master gears 12, 14 plus the error from the master gear spindles 22, 24 plus the error from the work gear holding device 26.

To isolate the error of a work or test gear, the errors from the remaining components must be calculated and then eliminated. The present method allows a user to isolate the error attributed to the work gear by calculating the errors due to the rolling master gears 12, 14, the master gear spindles 22, 24, and the work gear holding device spindle 26 and arbor 28 and then mathematically eliminating those errors from the subsequent calculations.

The method includes mounting a gear 16, which may either be a work gear or a precision setting master gear, with two rolling master gears 12, 14 used to determine the accuracy of a work gear. In normal operation, a work gear is positioned on spindle 26 as gear 16. However, while a work gear may be used in the present invention to evaluate the errors of the rolling master gears and rolling master gear spindles, it is preferable to use a precision setting master gear in place of the work gear on the work gear spindle. Therefore, the following hereafter will refer to the gear 16 as a precision setting master gear. In the present method, precision setting master gear 16 refers to any gear, precision setting or otherwise, which is placed on the work arbor 28 and spindle 26.

The rolling master gears 12, 14 are driven by the precision setting master gear 16 to produce a test signal. The test signal corresponds to the differential movements between the rolling master gears 12, 14 and the precision setting master gear 16 during rotation in tight double flank mesh. In the double flank testing arrangement, the axes or shafts of the master gears 12, 14 and the precision setting master gear 16 are resiliently urged together, such that each gear tooth of the rolling master gears 12, 14 constantly engages the adjacent faces or surfaces of the gear teeth of the precision setting master gear 16. In the double flank system, relative shaft displacements between the shafts of the rolling master gears 12, 14 and the precision setting master gear 16 are measured as a measure of gear error. It will be noted that displacements in other directions may also be measured, the foregoing being by way of example only.

Once the test signal is produced, the error due to these elements of the system are eliminated; separation of imperfections attributable to the rolling master gears 12, 14, the rolling master gear spindles 22, 24 and the work holding device spindle 26 and arbor 28 are eliminated from the test signal such that the imperfections or irregularities of a precision setting master gear can be isolated.

The present method involves a two step analysis to separate the errors in the rolling master gears 12, 14, the rolling master spindles 22, 24, the work holding device spindle 26, and the arbor 28 from the error in the precision setting master gear 16. To do this, the present method analyzes three "axes of movement" for each of the rolling master gears 12, 14, rolling master spindles 22, 24, and the work holding device spindle 26 and arbor 28. Two different heads are used to measure the three axes of measurement. Gear mesh center distance is measured using one gear head, a center distance rolling master 12. Gear lead and tooth thickness variation ("taper") are measured with a second gear head, a lead/taper rolling master, also known as a center-relieved rolling master gear 14. The measurements are evaluated through inline inspection equipment, such as the ITW Heartland System, commercially available from ITW Heartland of Alexandria, Minn.

The gear mesh center distance is evaluated to determine or assess all axes measurements. The distance is determined by sensing the center distance frequency as generated by rotating the precision setting master gear 16 with the rolling master gear 12 in metal-to-metal, double flank contact. The generated total composite signal is evaluated to accurately determine each individual gear element and categorize them according to set tolerances.

Gear lead or alignment checking is accomplished by measuring the variation in the lead plane of the precision setting master gear 16. The center-relieved rolling master gear 14 on a gimbal head mount 36 is used to determine gear lead, with the center-relieved rolling master gear 14 in metal-to-metal double flank contact with the precision setting master gear 16. The generated total composite signal for gear lead is evaluated and also categorized according to set tolerances.

Tooth thickness varies along the face width of the gear (length of tooth in the axial plane). This variation is measured in the taper plane of the precision setting master gear 16. Again, the center-relieved rolling master gear 14 on a gimbal head 36 is used to determine gear taper with the rolling master gear 14 in metal-to-metal, double flank contact with the precision setting master gear 16. Again, the generated total composite signal is evaluated and categorized according to set tolerances.

Having discussed the three axis of movement measurements evaluated in the present method, the method to separate the errors will be discussed.

The first step in isolating the error in a precision setting master gear is to remove the error of the rolling master gears 12, 14 and the rolling master gear spindles 22, 24 from the total error. This step is known as Master Gear Correction and is described in Kobetsky, U.S. Pat. No. 4,704,799, commonly assigned with the present application and incorporated herein by reference. The rolling master gears 12, 14 are rolled with, preferably, a precision setting master gear 16 in double flank tight mesh. Either one or both of the rolling master gear spindles 22, 24 on which the rolling master gears 12, 14 are mounted have XX count encoders.

Referring to FIGS. 1 and 2, the present invention advantageously provides a method for compensating for the contribution of master gear error in a gear checking or gear testing apparatus which employs rolling master gears in mesh with a precision setting master gear or "part" to be checked. The apparatus includes rolling master gears 12, 14 and a precision setting master gear 16. The rolling master gears 12, 14 and precision setting master gear 16 are each mounted on a shaft or spindle 22, 24, 26. The shafts are spaced apart by an appropriate amount to maintain the three gears 12, 14, and 16 in mesh or engagement so as to transmit rotational forces therebetween.

In accordance with the preferred form of the invention, the gears 12, 14, and 16 and associated spindles are arranged for double flank rotation. That is, the gears 12, 14, and 16 are arranged and intermeshed in such a way that each tooth of the master gears 12, 14 contacts both sides or "flanks" of each tooth of the precision setting master gear 16 as the three gears are rotated in mesh. This double flank engagement or rotation is such as to eliminate what is known in the art as "backlash" between the gears. The center-relieved rolling master gear 14 and spindle 24 are mounted on a gimbal head 36, allowing for pitch and yaw movement, as indicated by directional arrows 40, 42, of the gear 14. In addition, the center-distance rolling master gear 12 is mounted such that it can move laterally, as indicated by directional arrow 38.

One of the three spindles 22, 24, 26 and preferably, the work spindle 26 is rotated by a motor so as to rotate the precision setting master gear 16 directly. Hence, the rolling master gears 12, 14 are rotated simultaneously and indirectly by the precision setting master gear 16, in accordance with their intermeshing with the precision setting master gear 16.

A displacement measurement is then taken for each tooth interval. The total number of readings is equal to the product of the number of teeth on the precision setting master gear 16 times the number of teeth on the larger of the two rolling master gears 12, 14.

The data is normalized effectively comparing all teeth of the rolling master gears 12, 14 to a single reference on the precision setting master gear 16. A table is generated for the error in the rolling master gears and rolling master gear spindles 22, 24 for each of the three axes of movement for the double flank functional gear inspection.

Having measured the differential movement between the rolling master gears 12, 14 and the precision setting master gear 16 during rotation, and having associated the data obtained with individual master gear teeth, the method and apparatus of the invention proceed by developing test signals corresponding to this differential movement. These test signals are processed to form a plurality of individual error signals, each of which corresponds to the engagement of a given tooth of the rolling master gears 12, 14 with a given tooth of the precision setting master gear 16. Accordingly, a generally tabular array of data may be accumulated, with each data point or entry thereof corresponding to a value associated with the engagement of one of the teeth of the rolling master gears' 12, 14 with one of the teeth of the precision setting master gear 16. This data is accumulated until a plurality of teeth of the rolling master gears 12, 14 have contacted a plurality of teeth of the precision setting master gear 16 and a corresponding error signal has been produced for each individual contact.

The second step in isolating the error in the precision setting master gear 16 is to remove the error in the work holding device (work arbor 28 and work spindle 26) from the total error. With the error in the rolling master gears 12, 14 and associated spindles 22, 24 removed from the readings, the rolling master gears 12, 14 are again rolled with a precision setting master gear or precision setting master gear 16 in double flank tight mesh.

The work spindle 26 on which the arbor 28 is mounted has a revolution encoder. The encoder count or number of degrees of rotation is dependent on the number of positions needed for a desired accuracy. In a present embodiment, there are 5 positions for which measurements are taken; thus, the arbor 28 and work spindle 26 are rotated 72 degrees. A displacement measurement for each of the axes of measurement is taken for each of the five (5) radial count positions for one revolution of the precision setting master gear 16. The number of positions can be anything greater than two; however, the greater the number of positions used, the better the accuracy of the calculation.

Figure 3A:
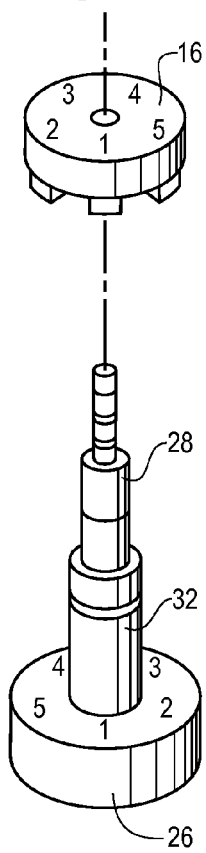
FIG. 3 A-E are perspective views illustrating the placing of the work gear in various radial positions.
Figure 3B:
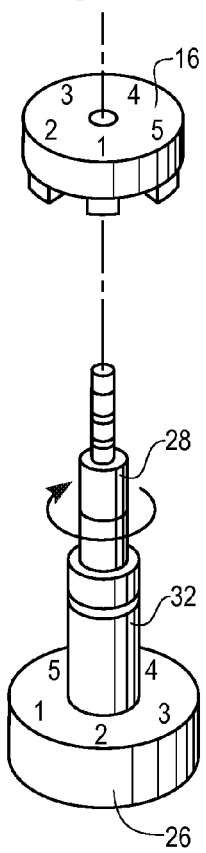

The generated total displacement signal for each of the axes of measurement for position one (1) is collected and stored for one revolution of the precision setting master gear 16. The work spindle 26 is then stopped and the precision setting master gear 16 is unclamped and is picked off the arbor 28. In a present embodiment, a six-axis robot picks up the precision setting master gear 16 from the arbor 28/spindle 26; however, other methods of removing the precision setting master gear 16 are contemplated. The work spindle 26 and arbor 28 are then rotated to an equal number of positions in the full 360 degrees of rotation, as shown in FIGS. 3A-B. Ideally, the number of degrees for each position change would be 360 divided by the number of positions. The precision setting master gear 16 is not rotated; instead, it maintains the exact radial position as the arbor 28 prior to the arbor rotating. The 6 (six) axis robot loads the precision setting master gear 16 back onto the arbor 28. The precision setting master gear 16 is now clamped into position (2).

Figure 3C:
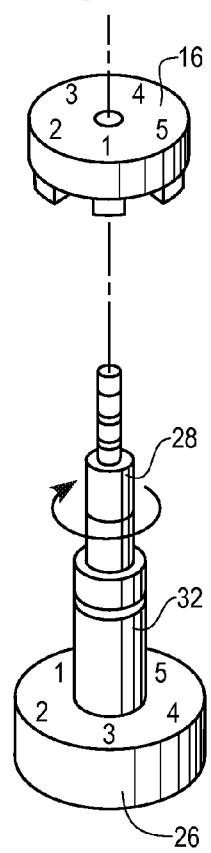

The rolling master gears 12, 14 are again rolled in double flank mesh with the precision setting master gear 16. The generated total displacement signal for each of the axes of measurement for position (2) is collected and stored for one revolution of the precision setting master gear 16. The work spindle 26 is then stopped and the precision setting master gear 16 is unclamped. The 6 (six) axis robot picks up the precision setting master gear 16 off the arbor 28. The work spindle 26 and arbor 28 are then rotated to the next radial position three (3), as is shown in FIGS. 3B-C. The precision setting master gear 16 is not rotated; instead, it maintains the exact radial position as the arbor 28 prior to the arbor rotating. The 6-axis robot loads the setting master gear 16 onto the arbor 28. The precision setting master gear 16 is now clamped into position (3).

Figure 3D:
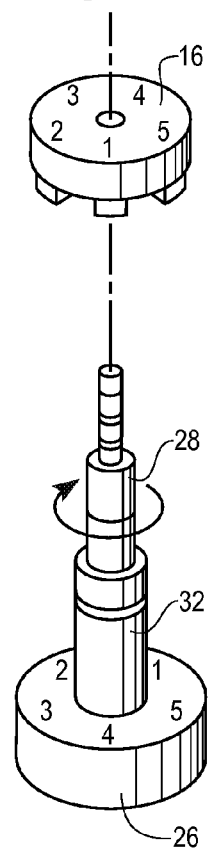

The rolling master gears 12, 14 are again rolled in double flank mesh with the precision setting master gear 16. The generated total displacement signal for each of the axes of measurement for position (3) is collected and stored for one revolution of the setting master gear 16. The work spindle is then stopped and the setting master gear 16 is unclamped. The 6 (six) axis robot picks up the precision setting master gear 16 off the arbor. The work spindle 26 and arbor 28 are then rotated to the next radial position (4), as is shown in FIGS. 3C-D. The precision setting master gear 16 is not rotated; instead, it maintains the exact radial position as the arbor 28 prior to the arbor rotating. The 6-axis robot loads the setting master gear 16 onto the arbor 28. The precision setting master gear 16 is now clamped into position (4).

Figure 3E:
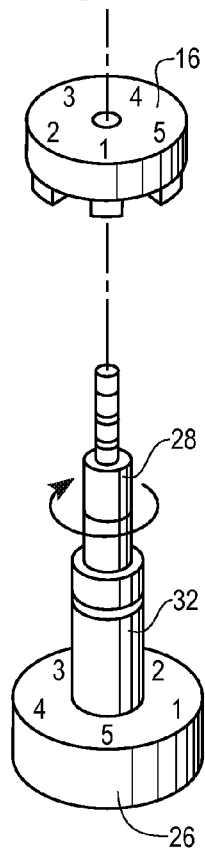

The rolling master gears 12, 14 are again rolled in double flank mesh with the setting master gear 16. The generated total displacement signal for each of the axes of measurement for position (4) is collected and stored for one revolution of the setting master gear 16. The work spindle 26 is then stopped and the precision setting master gear 16 is unclamped. The 6 (six) axis robot picks up the setting master gear 16 off the arbor and maintains the exact radial position with the arbor 28. The work spindle 26 and arbor 28 are then rotated to the next radial position (5), as is shown in FIGS. 3D-E. The 6-axis robot loads the setting master gear 16 onto the arbor 28. The work gear or precision setting master gear 16 is now clamped into position (5).

Figure 4:
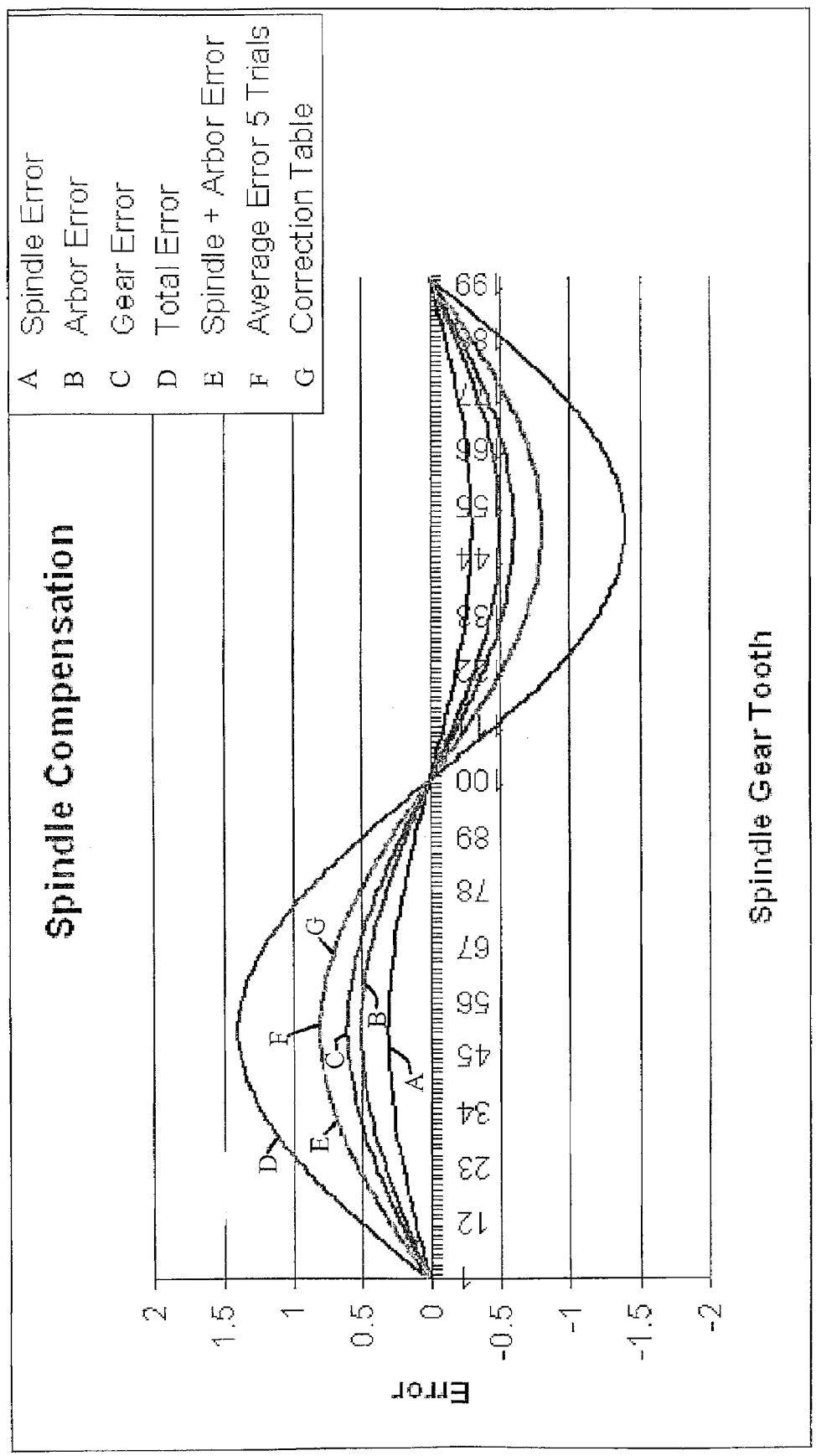
FIG. 4 is a graph of a best fit sine curve applied to normalize data received using the present disclosed method.

The procedure is continued until 360 degrees of rotation of the work spindle 26 and arbor 28 have been tested. The data is averaged, effectively removing the error induced by the precision setting master gear 16. A best fit sine curve, as shown in FIG. 4, is applied to normalize the data to make the correction offset from zero and to remove any effects of out-of-roundness (the difference between the largest and smallest radius of a measured profile) in the precision setting master gear 16.

The data collected compensates for the state of the arbor-induced errors in the physical shape of the arbor 28 and spindle 26. The data is collected and stored for each of the three axes of movement for the double flank functional gear inspection.

The present method's two steps allows the total amount of error from the rolling master gears, master gear spindles, work spindles, work gear holding device, and piece part work holding device to be mathematically removed from the composite gear measurement of the three axes of movement for the double flank gear inspection and for the error in the precision setting master gear 16 to be isolated.

The advantages of the present method are numerous. Error compensation is done with the same displacement measurement device as is used for the actual double flank functional gear inspection. Because compensation is done using a precision setting master gear in a tight mesh with the rolling master gear, the forces are identical to the actual double flank functional gear inspection. No errors due to structural flexing are introduced into the error compensations.

In addition, the complete compensation is done automatically without variables induced by human intervention or inconsistencies. Because the compensation is done automatically, the operator is free to attend to other requirements, thus significantly reducing the set-up change over time.

Also, compensation is done automatically with the machine guarding fully closed and locked.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A method for providing error compensation in a double flank functional gear testing apparatus, the method comprising the steps of:
   generating a total composite signal;
   evaluating an error in a master gear;
   evaluating an error in a master gear spindle;
   evaluating an error in a work gear holding device;
   eliminating a master gear error, a master gear spindle error, and a work gear holding device error from the total composite signal.

2. The method for providing for error compensation of claim 1, wherein a total displacement signal is generated for gear mesh center distance.

3. The method for providing for error compensation of claim 1, wherein a total displacement signal is generated for gear lead.

4. The method for providing for error compensation of claim 1, wherein a total displacement signal is generated for gear taper.

5. The method for providing for error compensation of claim 1, wherein a total displacement signal is generated for gear mesh center distance, gear lead, and gear taper simultaneously.

6. The method for providing for error compensation of claim 1, wherein the error in the master gear is determined by comparing teeth on the master gear to a single reference on a precision setting master gear.

7. The method for providing for error compensation of claim 6, wherein the error in the master gear is determined by comparing teeth on the master gear to a single reference on a precision setting master gear, measuring a gear mesh distance, a gear lead, and a gear taper simultaneously.

8. The method for providing for error compensation of claim 1, wherein the error in the master gear spindle is determined by comparing teeth on the master gear to a single reference on a precision setting master gear.

9. The method for providing for error compensation of claim 8, wherein the error in the master gear is determined by comparing teeth on the master gear to a single reference on a precision setting master gear, measuring a gear mesh distance, a gear lead, and a gear taper simultaneously.

10. The method for providing for error compensation of claim 1, wherein a precision setting master gear is mounted to the work holding device, the work holding device including a work spindle and an arbor.

11. The method for providing for error compensation of claim 10, wherein the error in the work spindle and the arbor are determined by rolling the precision setting master gear with the master gear in double flank tight mesh.

12. The method for providing for error compensation of claim 11, wherein the precision setting master gear is loaded on the work spindle and arbor arbitrarily.

13. The method for providing for error compensation of claim 11, wherein a displacement measurement is evaluated for each of a plurality of radial count positions for one revolution of the precision setting master gear.

14. The method for providing for error compensation of claim 11, wherein a total displacement measurement for gear mesh center distance is taken for each of a plurality of radial count positions for one revolution of the precision setting master gear.

15. The method for providing for error compensation of claim 11, wherein a total displacement measurement for gear lead is taken for each of a plurality of radial count positions for one revolution of the precision setting master gear.

16. The method for providing for error compensation of claim 11, wherein a total displacement measurement for gear taper is taken for each of a plurality of radial count positions for one revolution of the precision setting master gear.

17. The method for providing for error compensation of claim 11, wherein total displacement measurements for gear mesh center distance, gear lead, and gear taper are evaluated simultaneously for each of a plurality of radial count positions for one revolution of the precision setting master gear.

18. The method for providing for error compensation of claim 13, wherein the total displacement measurement for gear mesh center distance is taken for each of the plurality of radial count positions for one revolution of the precision setting master gear, wherein the plurality of radial count positions refers to 360 divided by a number of degrees of rotation of the arbor and spindle with respect to the precision setting master gear.

19. The method for providing for error compensation of claim 18, wherein the total displacement measurements are evaluated with the arbor and spindle and precision setting master gear in the same radial position.

20. The method for providing for error compensation of claim 18, wherein the total displacement measurements for gear mesh center distance, gear lead, and gear taper are evaluated, the arbor and spindle having rotated to a different radial position than the precision setting master gear.

* * * * *